(12) United States Patent
Fuchimukai

(10) Patent No.: US 7,334,949 B2
(45) Date of Patent: Feb. 26, 2008

(54) MIRROR BOX AND ELECTRONIC STILL CAMERA

(75) Inventor: Atsushi Fuchimukai, Tokyo (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 11/539,957

(22) Filed: Oct. 10, 2006

(65) Prior Publication Data

US 2007/0086774 A1    Apr. 19, 2007

Related U.S. Application Data

(62) Division of application No. 09/984,728, filed on Oct. 31, 2004, now Pat. No. 7,136,104.

(30) Foreign Application Priority Data

Dec. 15, 2000   (JP)   ............................. P2000-381761

(51) Int. Cl.
    *G03B 19/12*    (2006.01)
(52) U.S. Cl. ....................... 396/355; 348/341; 348/342
(58) Field of Classification Search ................ 396/354, 396/355, 378, 380, 232; 348/340–342
    See application file for complete search history.

(56) References Cited

U.S. PATENT DOCUMENTS

| | | | |
|---|---|---|---|
| 3,810,202 A * | 5/1974 | Uno et al. ................... | 396/232 |
| 3,890,627 A * | 6/1975 | Uno ............................. | 396/355 |
| 4,384,210 A | 5/1983 | Stauffer | |
| 4,557,580 A | 12/1985 | Suzuki | |
| 4,605,295 A * | 8/1986 | Ohno et al. .................. | 396/355 |
| 4,641,022 A | 2/1987 | Suzuki | |
| 4,757,387 A | 7/1988 | Saito | |
| 5,130,740 A | 7/1992 | Suda et al. | |
| 5,778,270 A | 7/1998 | Morisawa | |
| 5,828,918 A | 10/1998 | Abe et al. | |
| 6,122,456 A | 9/2000 | Yamamoto | |
| 6,227,726 B1 * | 5/2001 | Higuchi ....................... | 396/358 |
| 6,700,617 B1 | 3/2004 | Hamamura et al. | |
| 7,136,104 B2 | 11/2006 | Fuchimukai | |

* cited by examiner

*Primary Examiner*—Christopher Mahoney
(74) *Attorney, Agent, or Firm*—Greenblum & Bernstein, P.L.C.

(57) ABSTRACT

A mirror box includes a mirror that is selectively set to one of a reflecting position, which is on an optical path between a photographing lens and an imaging device so that incident light passing through the photographing lens is reflected to a view-finder, and a retracted position, which is out of the optical path so that said incident light is led to the imaging device. A filter is selectively set to one of a non-functioning position, which is close to the mirror, when the mirror is set to the reflecting position, and a functioning position, which is on the optical path so that a predetermined light component contained in the incident light is blocked, when the mirror is set to the retracted position. The filter comprises an optical low-pass filter, and the mirror comprises a half-mirror which is integrally provided on an incident surface of the optical low-pass filter.

12 Claims, 7 Drawing Sheets

MIRROR BOX AND ELECTRONIC STILL CAMERA

CROSS-REFERENCE TO RELATED APPLICATION

The present application is a divisional application of pending U.S. patent application Ser. No. 09/984,728, filed on Oct. 31, 2001, which claims priority based upon Japanese Application No. 2000-381761, filed Dec. 15, 2000, the contents of which are expressly incorporated by reference herein in their entirety.

BACKGROUND OF THE INVENTION

1. Field of the Invention

The present invention relates to a mirror box, which is mounted in an electronic still camera, to lead light entering through a photographing lens selectively to a view-finder or an imaging device such as a CCD.

2. Description of the Related Art

Conventionally, there is known an electronic still camera which is a single-lens reflex type. The single-lens reflex camera is provided with a quick return mirror, which is set on an optical path between the photographing lens and the imaging device, to lead the incident light from the photographing lens the view-finder. Conversely, in a photographing operation, the quick return mirror is retracted from the optical path, so that a subject image is formed on the imaging device.

In an electronic still camera which utilizes a CCD as the imaging device, an optical low-pass filter removing a high-frequency component is fixed between the photographing lens and the CCD, so as to prevent the generation of moiré fringes. Moiré fringes occur when the incident light has a high-frequency component, so that the image quality is lowered. similarly, an infrared cut filter may be provided for preventing the deterioration of exact color reproduction, which occurs because of infrared light.

SUMMARY OF THE INVENTION

Therefore, an object of the present invention is to provide a mirror box which is mounted in a single-lens reflex type electronic still camera, and which compactly houses a quick return mirror and an optical low-pass filter.

According to the present invention, there is provided a mirror box comprising a mirror that is selectively set to one of a reflecting position and a retracted position, and a filter that is selectively set to one of a non-functioning position and a functioning position.

The reflecting position is on an optical path between a photographing lens and an imaging device so that incident light passing through the photographing lens is reflected to a view-finder. The retracted position is out of the optical path so that the incident light is led to the imaging device. The non-functioning position is close to the mirror, when the mirror is set to the reflecting position. The functioning position is on the optical path so that a predetermined light component contained in the incident light is blocked, when the mirror is set to the retracted position.

The predetermined light component may contain a high-frequency component, and may contain an infrared wave length component.

The filter may comprise an optical low-pass filter, and the mirror may comprise a quick return mirror which is separately provided from the optical low-pass filter.

The mirror box may further comprise a drive mechanism that drives the mirror and the filter in association with each other. Preferably, the drive mechanism comprises a motor, a first gear, a first arm, a second gear, and a second arm. The first gear rotates in association with the motor, and has a first cam groove. The first arm has a first cam follower engaged with the first cam groove. The first cam follower is moved along the first cam groove so that the mirror is moved between the reflecting position and the retracted position. The second gear rotates in association with the motor, and has a second cam groove. The second arm has a second cam follower engaged with the second cam groove. The second cam follower is moved along the second cam groove so that the filter is moved between the non-functioning position and the functioning position.

The reflecting position may be inclined by substantially 45 degrees to the optical axis of the photographing lens, the retracted position is substantially parallel to the optical axis, the non-functioning position is behind the mirror and is parallel to the mirror when the mirror is set to the reflecting position, and the functioning position is perpendicular to the optical axis.

The filter may comprise an optical low-pass filter, and the mirror may comprise a half-mirror which is integrally provided on an incident surface of the optical low-pass filter.

Further, according to the present invention, there is provided an electronic still camera comprising a view-finder through which a subject image obtained by a photographing lens can be observed, a half mirror that is integrally provided with an optical low-pass filter, and a view-finder shutter.

The half mirror is integrally provided with an optical low-pass filter. The half mirror is provided between the photographing lens and an imaging device. The half mirror is moved between a first position, at which incident light passing through the photographing lens is reflected to the view-finder, and a second position, at which a predetermined light component contained in the incident light is blocked, to lead the incident light to the imaging device. The view-finder shutter is provided between the view-finder and the half mirror. The view-finder shutter blocks light when the half mirror is set to the second position.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
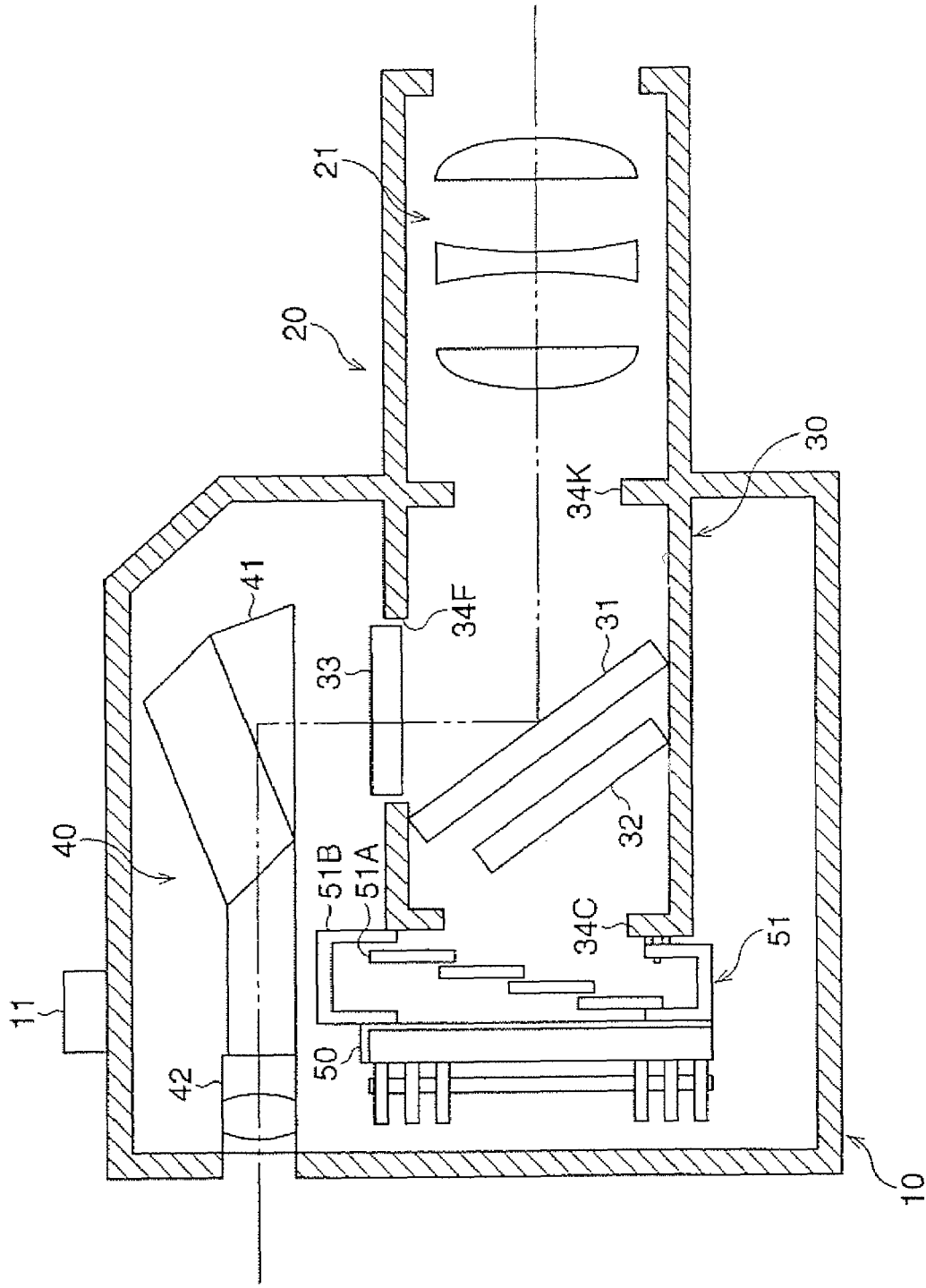
FIG. 1 is a sectional view of an electronic still camera to which a first embodiment is applied, and which is in a subject observing state.

The present invention will be described below with reference to an embodiment shown in the drawings.

FIG. 1 shows an electronic still camera to which a first embodiment is applied, and which is set in a subject observing state.

A shutter button 11 is provided on an upper surface of a camera body 10 of the electronic still camera. A lens barrel 20, in which a photographing lens group 21 is housed, is detachably connected to a front surface of the camera body 10. Incident light passing through the photographing lens group 21 is subjected to a light amount adjustment by an aperture (not shown), and enters the camera body 10.

A CCD 50, which is an imaging device, is mounted in the camera body 10, and a mirror box 30 is disposed on an optical path between the CCD 50 and the photographing lens group 21. The mirror box 30 is provided for leading the incident light to the CCD 50 or a view-finder 40 disposed above the mirror box 30, in which a quick return mirror 31 and an optical low-pass filter 32 are housed in order, when viewed from the photographing lens group 21.

The quick return mirror 31 is a plane mirror, and is set to a reflecting position, which is on the optical path and inclined by substantially 45 degrees to the optical axis of the photographing lens group 21. The quick return mirror 31 at the reflecting position totally reflects the incident light, passing through the photographing lens group 21 and a first opening 34K formed between the lens barrel 20 and the mirror box 30, to the view-finder 40. The reflected incident light passes through a second opening 34F and is led to a focusing glass 33, so that a subject image is formed on the focusing glass 33. The subject image can be observed through a pentagonal prism 41 and an eyepiece 42.

The optical low-pass filter 32 is a flat plate slightly smaller than the quick return mirror 31. The optical low-pass filter 32 is a crystal liquid plate filtering a high-frequency component, and is made of a quarts plate, for example. In the embodiment, an infrared filter blocking an infrared light component is adhered on the optical low-pass filter 32. Therefore, a high-frequency component and an infrared light component contained in light entering the optical low-pass filter 32 are removed, and are led to the CCD 50. When the quick return mirror 31 is set to the reflecting position, the optical low-pass filter 32 is set to a non-functioning position, which is close to the quick return mirror 31. The non-functioning position is behind the quick return mirror 31, and is parallel to the quick return mirror 31. In this state, the incident light is totally reflected by the quick return mirror 31, and thus, is not led to the optical low-pass filter 32 nor the CCD 50.

A shutter 51 provided between the mirror box 30 and the CCD 50. The shutter 51 has a shutter curtain 51A composed of some plates, and a shutter curtain housing unit 51B in which the shutter curtain 51A is housed. When a subject image is observed, the shutter curtain 51A is positioned to cut the optical path to block the light to the CCD 50.

Figure 2:
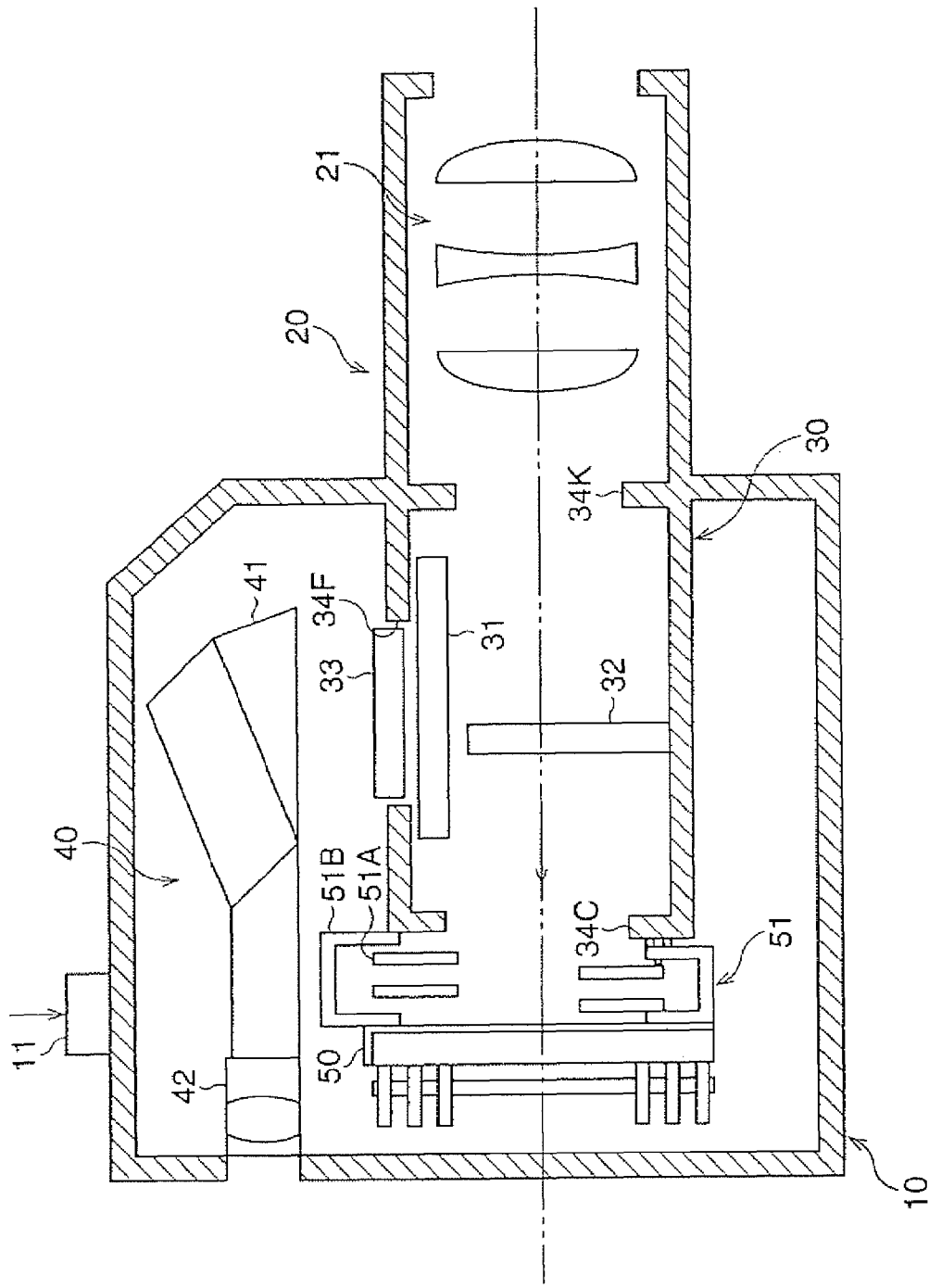
FIG. 2 is a sectional view of the electronic still camera which is set in a photographing operation.

FIG. 2 shows the electronic still camera is set in a photographing operation.

In the photographing operation, the shutter button 11 is depressed, so that the quick return mirror 31 is moved from the reflecting position shown in FIG. 1 to a retracted position, which is out of the optical path, and in which the quick return mirror 31 is parallel to a focusing glass 33 to retract from the optical path. Thus, the quick return mirror 31 closes the second opening 34F, so that the incident light cannot enter the view-finder 40. Accordingly, the subject image cannot be observed through the eyepiece 42, and thus a blackout state occurs in the view-finder 40. Further, at this time, light entering the eyepiece 42 is blocked by the quick return mirror 31, and cannot be received by the CCD 50 through the second opening 34F.

On the other hand, the optical low-pass filter 32 is moved from the non-functioning position shown in FIG. 1 to a functioning position, in which the optical low-pass filter 32 is perpendicular to the optical axis of the photographing lens group 21. In this movement, the optical low-pass filter 32 does not contact the quick return mirror 31 which is set to the retracted position. The incident light enters the optical low-pass filter 32 set to the functioning position, so that a high-frequency component and an infrared wave length component are removed from the incident light, and thus the incident light is led to the CCD 50 through a third opening 34C formed in the mirror box 30.

Thus, the optical low-pass filter 32 is moved to the functioning position only in the photographing operation, and is set to the non-functioning position when the subject image is observed. Due to this, the quick return mirror 31 and the optical low-pass filter 32 can be provided close to each other. Namely, in comparison with a case in which the optical low-pass filter 32 is always fixed in a specific position and is parallel to the CCD 50, the quick return mirror 31 and the optical low-pass filter 32 can be housed in a narrow space.

In the shutter 51, the shutter curtain 51A is housed in the shutter curtain housing unit 51B, so that the CCD 50 is exposed for a predetermined time of period. Thus, the incident light from which a high-frequency component is removed is led to the CCD 50 to sense a subject image.

Figure 3:
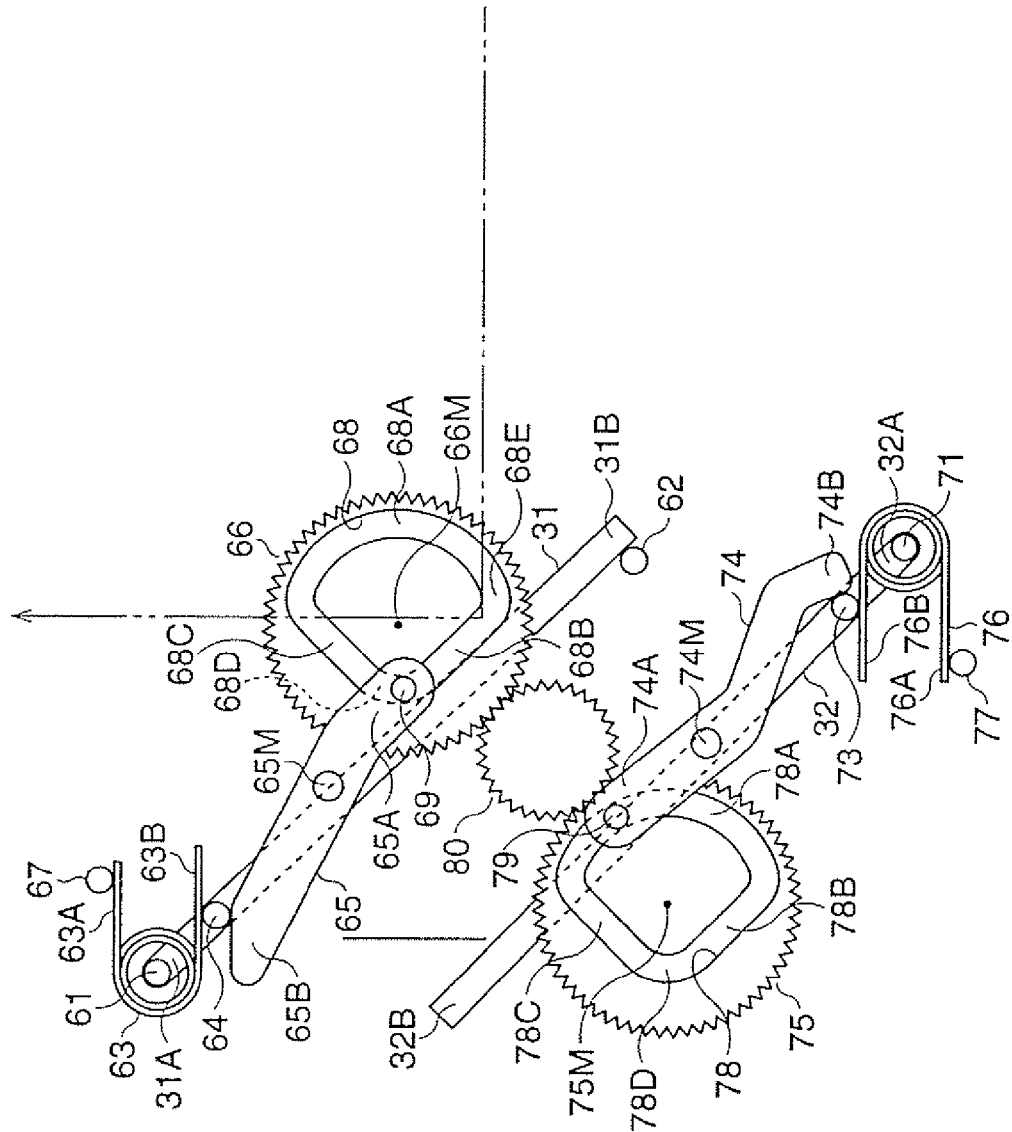
FIG. 3 is a view showing a drive mechanism when a subject image is observed.

FIG. 3 shows a drive mechanism which drives the quick return mirror 31 and the optical low-pass filter 32 when the subject image is observed.

An upper end portion 31A of the quick return mirror 31 is rotatably connected to a mirror support shaft 61, which is integrally provided in the mirror box 30. The quick return mirror 31 is rotated between the reflecting position and the retracted position about the mirror support shaft 61. A mirror urging spring 63 is wound around the mirror support shaft 61. One end portion 63A of the mirror urging spring 63 is engaged with a first spring fixation member 67 provided in the mirror box 30, and the other end portion 63B is engaged with a mirror projection 64 provided in the quick return mirror 31. The mirror urging spring 63 urges the mirror projection 64 in a direction in which the end portions 63A and 63B are separated from each other, i.e., in which the mirror projection 64 parts from the first spring fixation member 67. Due to this, the quick return mirror 31 is urged in the clockwise direction in the drawing. On the other hand, a lower end portion 31B of the quick return mirror 31 is engaged with a mirror stopper 62 provided at a position under the mirror support shaft 61. Due to this, the quick return mirror 31 is fixed at the reflecting position, so that the incident light is totally reflected to the view-finder 40 as shown by a chain double-dashed line in the drawing.

A motor (not shown) for rotating the quick return mirror 31 is mounted in the mirror box 30. A dive gear 80 is fixed on an output shaft of the motor. The drive gear 80 is meshed with a first gear 66, so that the first gear 66 is rotated by the motor.

A first cam groove 68 is formed on a side surface of the first gear 66. The first cam groove 68 has an arc portion 68A and two straight portions 68B and 68C. The straight portions 68B and 68C are connected to each other at end portions thereof, and the other end portions of the straight portions 68B and 68C are connected by the arc portion 68A. The breadth of the first cam groove 68 is constant over the whole periphery. The arc portion 68A is formed along the outer periphery of the first gear 66, and is extended to cover a range of approximately 160 degrees from the central angle. A connecting portion 68D formed between the straight portions 68B and 68C is positioned opposite to the arc portion 68A with respect to the rotation center 66M of the first gear 66. The distance from the rotation center 66M to each of the straight portions 68B and 68C is essentially shorter than that from the rotation center 66M to the arc portion 68A.

A first arm 65 is provided beside the first gear 66, and extended between the first cam groove 68 and the mirror projection 64. A pin 65M fixed on a center portion of the first arm 65 is rotatably supported by the mirror box 30, so that the first arm 65 can be rotated about the pin 65M. A first cam follower 69 fixed to an end portion of the first arm 65 is engaged with the first cam groove 68, so that the first arm 65 is rotated about the pin 65M due to the change of the position of the first cam follower 69 when the first gear 66 is rotated.

In FIG. 3, the first cam follower 69 is engaged with the connecting portion 68D, and a lower end portion 65A of the first arm 65 is positioned close to the rotation center 66M of the first gear 66, so that the first arm 65 is inclined relative to the optical axis by approximately 30 degrees. At this time, the other end portion 65B of the first arm 65 is kept to abut against the mirror projection 64.

On the other hand, the optical low-pass filter 32 has a similar structure to the quick return mirror 31. Namely, a lower end portion 32A of the optical low-pass filter 32 is rotatably connected to a filter support shaft 71. Thus, the optical low-pass filter 32 is rotated between the non-functioning position and the functioning position about the filter support shaft 71. A filter urging spring 76 is wound around the filter support shaft 71. One end portion 76A of the filter urging spring 76 is engaged with a second spring fixation member 77 provided to the mirror box 30, and the other end portion 76B is engaged with a filter projection 73 provided to the optical low-pass filter 32. The filter urging spring 76 urges the filter projection 73 in a direction in which the end portions 76A and 76B are separated from each other, so that the optical low-pass filter 32 is urged in the clockwise direction in the drawing.

A second gear 75 is meshed with an opposite portion of the drive gear 80 relative to the first gear 66. A second cam groove 78 is formed on a side surface of the second gear 75. A second arm 74 is provided beside the second gear 75, and is rotatable about a pin 74M fixed on a center portion thereof. A second cam follower 79 fixed to an end portion of the second arm 74 is engaged with the second cam groove 78, so that the second arm 74 is rotated about the pin 74M when the second gear 75 is rotated.

In FIG. 3, the second cam follower 79 is engaged with an arc portion 78A of the second cam groove 78, so that an upper end portion of the second arm 74 is positioned close to the drive gear 80. In this state, a lower end portion 74B of the second arm 74 presses the filter projection 73 against the spring force of the filter urging spring 76, so that a rotation of the optical low-pass filter 32 in the clockwise direction is prevented.

Figure 4:
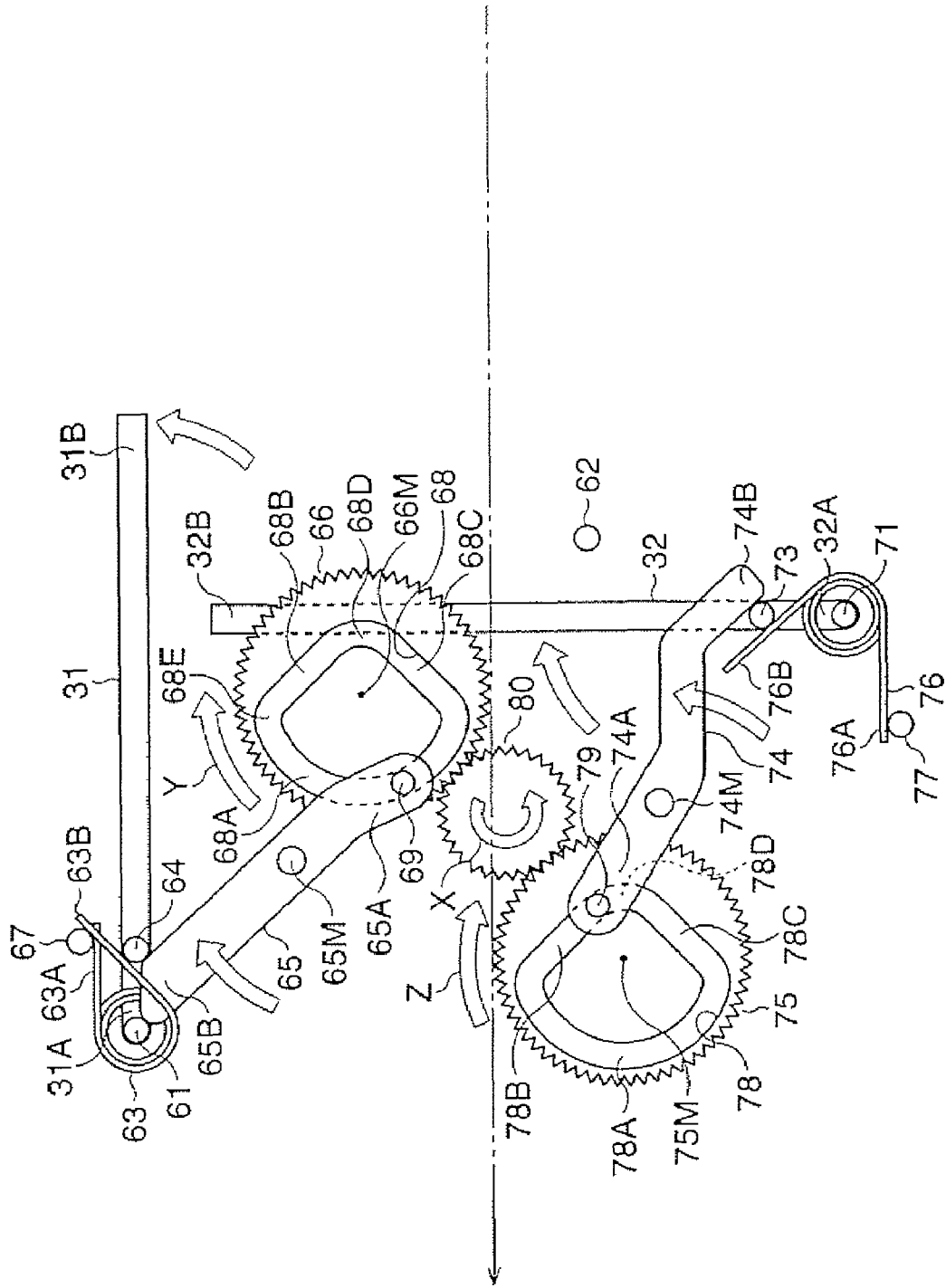
FIG. 4 is a view showing the drive mechanism when a photographing operation is performed.

FIG. 4 shows the drive mechanism when a photographing operation is performed.

When the release button 11 is depressed, the motor is actuated, so that the drive gear 80 is rotated in the counter clockwise direction as shown by an arrow X. Due to this, the first gear 66 is rotated in the clockwise direction shown by an arrow Y, and the second gear 75 is simultaneously rotated in the clockwise direction shown by an arrow Z.

By the clockwise rotation of the first gear 66, the first cam follower 69 is moved from the connecting portion 68D to the arc portion 68A through the straight portion 68B. When the first cam follower 69 is engaged with the straight portion 68B, the lower end portion 65A of the first arm 65 is positioned close to the rotation center 66M, similarly to the case shown in FIG. 3. Then, when the first cam follower 69 approaches a connecting portion 68E at which the straight portion 68B and the arc portion 68A are connected to each other, the lower end portion 65A of the first arm 65 is positioned further from the rotation center 66M of the first gear 66, so that the lower end portion 65A is pressed downward. Therefore, the first arm 65 is rotated in the clockwise direction about the pin 65M to rise relative to the optical axis. Thus, the other end portion 65B of the first arm 65 presses the mirror projection 64 against the spring force of the mirror urging spring 63, so that the quick return mirror 31 is rotated in the counter clockwise direction about the mirror support shaft 61.

On the other hand, by the rotation of the second gear 75 in the Z direction, the second cam follower 79 is moved from the arc portion 78A of the second cam groove 78 to a straight portion 78C. When the second cam follower 79 is engaged with the straight portion 78C, the second cam follower 79 is pulled toward a rotation center 75M of the second gear 75 while the second gear 75 is rotated, so that an upper end portion 74A of the second arm 74 is urged downward. Therefore, the second arm 74 is rotated about the pin 74M in the counter clockwise direction. Due to this, the filter projection 73 is urged by the filter urging spring 76, so that the optical low-pass filter 32 is rotated in the clockwise direction When the first cam follower 69 reaches the arc portion 68A, and the second cam follower 79 reaches a connecting portion 78D at which the straight portions 78B and 78C are connected, the first arm 65 and the second arm 74 are stopped at positions shown in FIG. 4. Namely, the quick return mirror 31 is set to the retracted position, and the optical low-pass filter 32 is set to the functioning position, where the optical low-pass filter 32 is supported by a stopper not shown to keep the functioning position.

After the photographing operation is completed, the drive gear 80 is rotated in the counter clockwise direction by the motor, so that the first and second gears 66 and 75 are rotated in the clockwise direction. As a result, the first cam follower 69 is moved from the arc portion 68A to the straight portion 68C, and the second cam follower 79 is moved from the connecting portion 78D to the arc portion 78A through the straight portion 78B, so that the drive mechanism returns to the initial state shown in FIG. 3.

Thus, in the photographing operation, the quick return mirror 31 is changed from the reflecting position to the retracted position, and at the same time, the optical low-pass filter 32 is set to the functioning position. The condition of the photographing operation, shown in FIG. 4, is maintained from a time when the release button 11 is depressed to a time when a predetermined exposure period of the CCD 50 has elapsed. When the photographing operation is completed, the quick return mirror 31 is changed from the retracted position to the reflecting position, and the optical low-pass filter 32 is changed from the functioning position to the non-functioning position. Thus, the drive mechanism drives the quick return mirror 31 and the optical low-pass filter 32 in association with each other.

Figure 5:
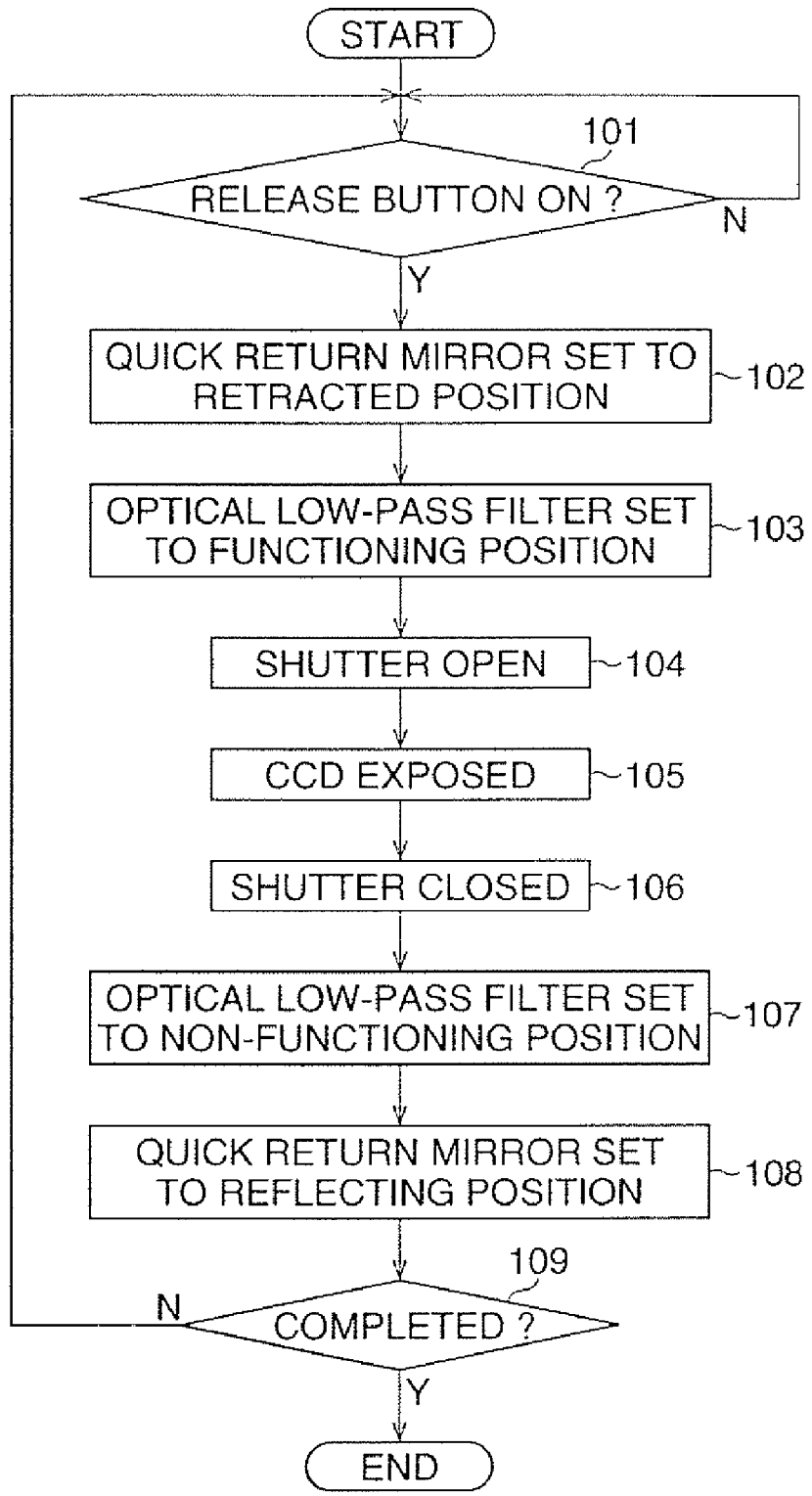
FIG. 5 is a flowchart of an operation of the electronic still camera in a photographing operation.

FIG. 5 is a flowchart of an operation of the electronic still camera in a photographing operation.

By turning ON an electric power switch (not shown) provided to the camera body 10, it is determined in Step 101 whether the release button 11 has been depressed or not. When it is determined that the release button 11 has been depressed, Step 102 is executed, in which the quick return mirror 31 is moved up from the optical path to the retracted position. In Step 103, then, the optical low-pass filter 32 is raised and set to the functioning position, so that the incident light is led to the optical low-pass filter 32.

In Step 104, the shutter curtain 51A is housed in the shutter curtain housing unit 51B, so that the shutter 51 is open. Therefore, in Step 105, the CCD 50 is exposed so that incident light from which a high-frequency component and an infrared light component are removed is led to the CCD 50. Thus, a sensing operation of a subject image is completed, and thus, the process goes to Step 106, so that the condition returns to the subject observing condition.

In Step 106, the shutter curtain 51A is moved to the optical path, so that the shutter 51 closes the optical path. In Step 107, the optical low-pass filter 32 is set to the non-functioning position. In Step 108, the quick return mirror 31 is set to the reflecting position, to return to the subject observing condition.

It is determined in Step 109 whether the photographing operation is to be completed, i.e., whether the electric power switch is turned OFF. When it is determined that the completion of the photographing operation has been selected, a photographing operation completion process is carried out, so that the photographing operation ends. Conversely, when it is determined that the completion of the photographing operation has not been selected, the process goes back to Step 101, and the process waits until the release button 11 is depressed.

As described above, according to the first embodiment, the quick return mirror 31 and the optical low-pass filter 32 can be disposed close to each other, and thus, the length of the mirror box 30 in the optical axial direction can be reduced.

Figure 6:
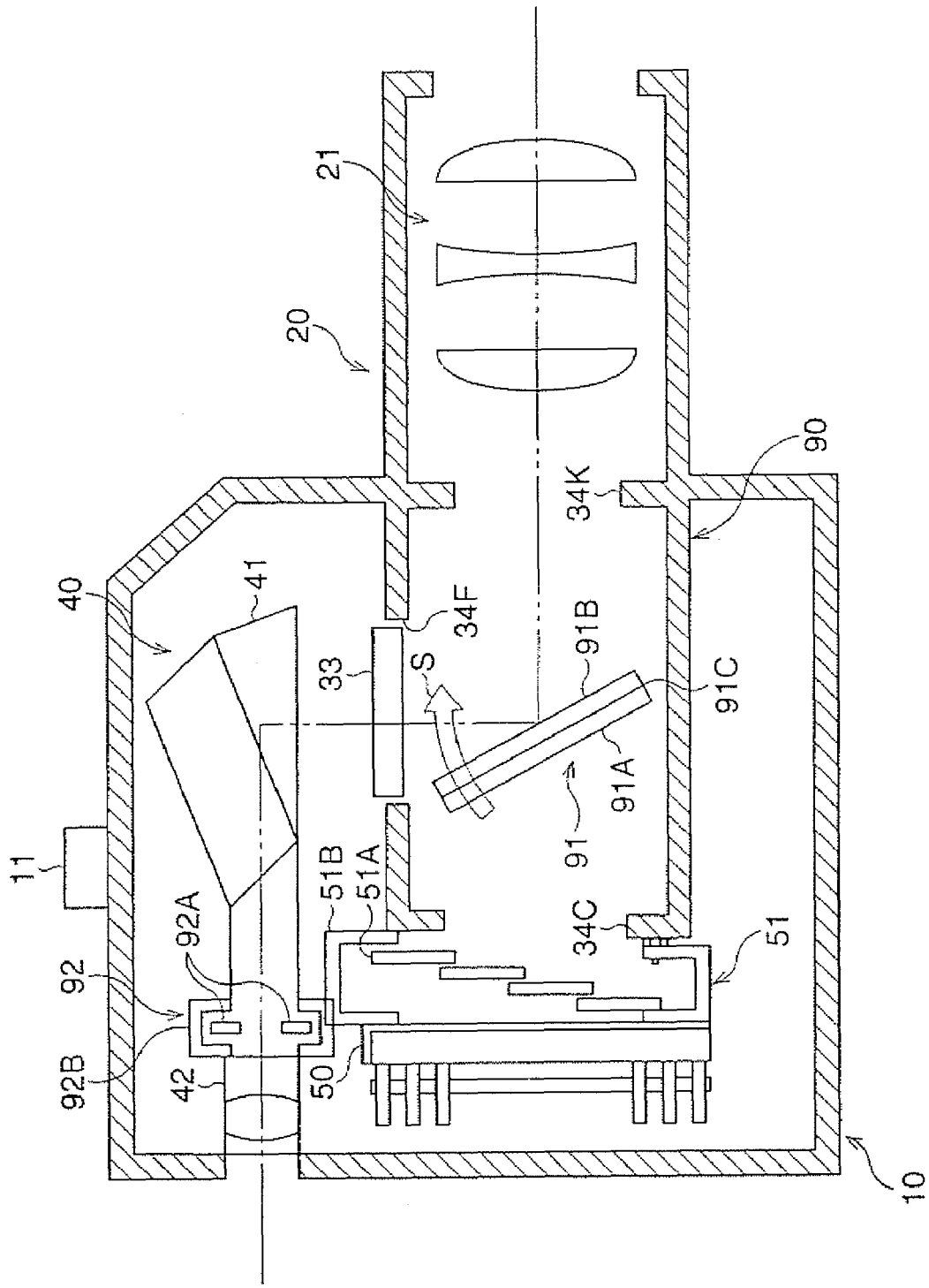
FIG. 6 is a sectional view of an electronic still camera to which a second embodiment is applied.

A second embodiment will be described below with reference to FIGS. 6 and 7. Although the quick return mirror 31 is separately provided from the optical low-pass filter in the first embodiment a half-mirror integrated filter 91, in which an optical low-pass filter 91A and a half-mirror 91B are integrally provided, is mounted in a mirror box 90 in the second embodiment. FIG. 6 is a sectional view of an electronic still camera of the second embodiment. Note that the corresponding parts to the first embodiment are indicated by the same reference numerals as those of the first embodiment.

In the mirror box 90, the half-mirror integrated filter 91 is located on the optical path between the photographing lens group 21 and the CCD 50. In the half-mirror integrated filter 91, the half-mirror 91B is integrally provided on an incident surface of the optical low-pass filter 91A.

The optical low-pass filter 91A is a crystal plate filtering a high-frequency component, similarly to the first embodiment, and an infrared cut filter for filtering an infrared component is adhered on the optical low-pass filter. The half-mirror 91B is a plane mirror, which reflects approximately a half of the incident light and passes the remaining half. Namely, in the incident light entering the half-mirror integrated filter 91, approximately a half of the light is reflected by the half-mirror 91B and the remaining half passes through the half-mirror 91B. The incident light passing through the half-mirror 91B has a high-frequency component and an infrared component removed, and is led to the CCD 50.

When observing a subject image, the half-mirror integrated filter 91 is set to a first position, which is inclined relative to the optical axis of the photographing lens group 21 by approximately 45 degrees. Due to this, approximately a half of the light reflected by the half-mirror 91B is led to the view-finder 40, so that a subject image is formed on the focusing glass 33. Conversely, although the incident light from which a high-frequency component and an infrared component are removed by the optical low-pass filter 91A is led to the CCD 50, since the shutter 51 is closed, the incident light is blocked by the shutter curtain 51A, and does not enter the CCD 50.

When carrying out a photographing operation, the half-mirror integrated filter 91 is rotated and rises in a direction shown by an arrow S (i.e., the clockwise direction in FIG. 6) about a lower end portion 91C, and is set to a second position which is perpendicular to the optical axis. In association with this rotation of the filter 91, the shutter 51 is fully open. Due to this, the incident light enters the half-mirror integrated filter 91 in a vertical direction. Namely, the incident light passes through the half-mirror integrated filter 91, so that a subject image is formed on the CCD 50. The incident light is not led to the focusing glass 33, since the half-mirror integrated filter 91 is upright.

In the view-finder 40, a view-finder shutter 92 is mounted between the pentagonal prism 41 and the eyepiece 42. The view-finder shutter 92 has a view-finder shutter curtain 92A and a view-finder shutter curtain housing unit 92B. The view-finder shutter curtain 92A is composed of some plates. When observing a subject image, the view-finder shutter curtain 92A is housed in the view-finder shutter curtain housing unit 92B, so that the subject image can be observed through the eyepiece 42. When the release button 11 is depressed, the view-finder shutter curtain 92A is set between the eyepiece 42 and the pentagonal prism 41 to block light entering through the eyepiece 42. Thus, light entering the eyepiece 42 is prevented from reaching the CCD 50.

Figure 7:
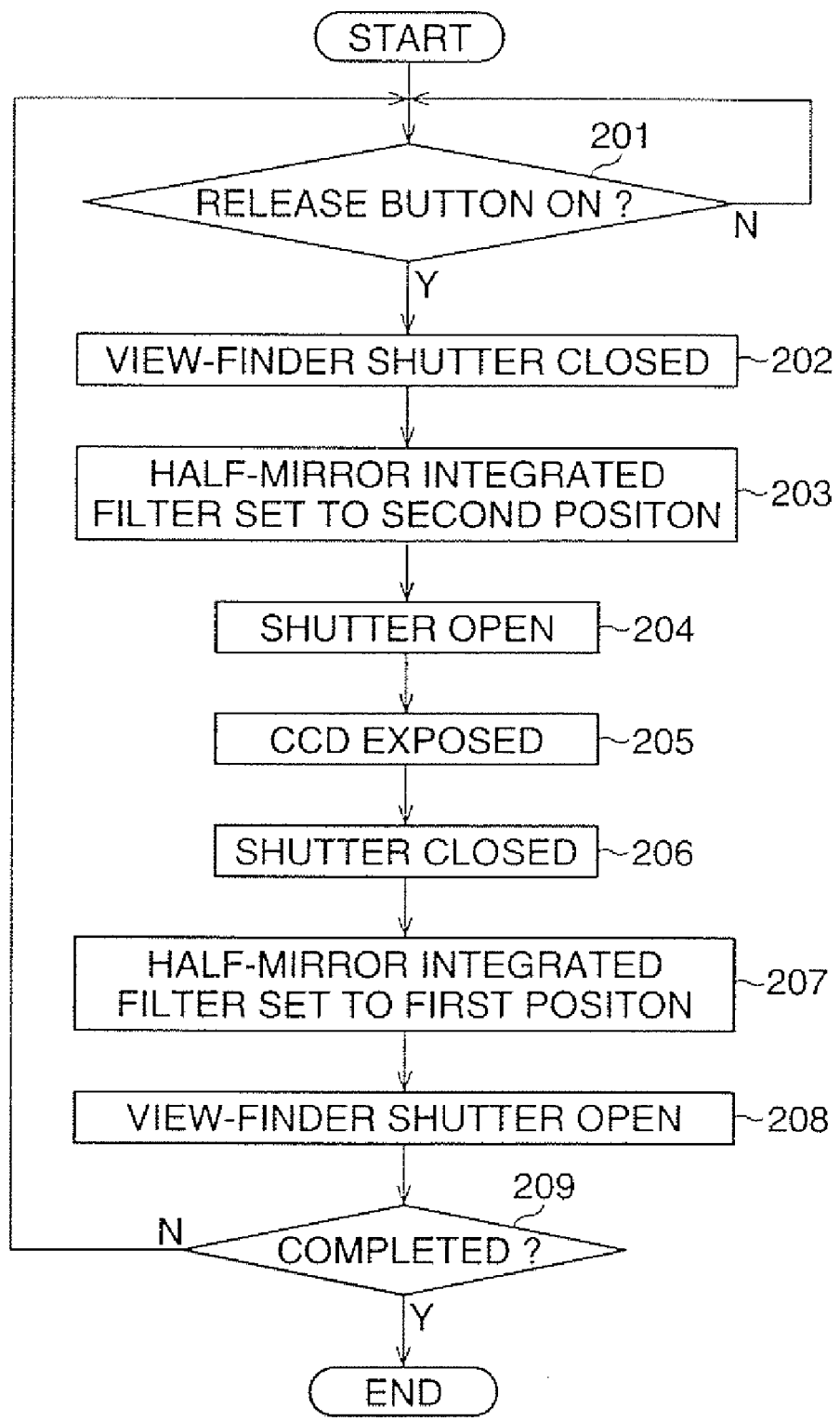
FIG. 7 is a flowchart of an operation of the electronic still camera in a photographing operation, to which the second embodiment is applied.

FIG. 7 is a flowchart of an operation of the electronic still camera in a photographing operation of the second embodiment.

By turning ON an electric power switch (not shown) provided on the camera body 10, it is determined in Step 201 whether the release button 11 has been depressed or not. When it is determined that the release button 11 has been depressed, Step 202 is executed in which the view-finder shutter curtain 92A is moved to a position to block light entering the eyepiece 42, and closes the view-finder shutter 92. In Step 203, the half-mirror integrated filter 91 is raised to the second position. In Step 204, the shutter curtain 51A is housed in the shutter curtain housing unit 513. Therefore, in Step 205, the CCD 50 is exposed so that a subject image is sensed. Thus, a sensing operation of a subject image is completed, and the process goes to Step 206, so that the condition returns to the subject observing condition.

In Step 206, the shutter curtain 51A is moved to the optical path, so that the shutter 51 closes the optical path. In Step 207, the half-mirror integrated filter 91 is moved from the second position to the first position. In Step 208, the view-finder shutter curtain 92A is housed in the view-finder shutter curtain housing unit 92B, so that the view-finder shutter 92 is open, to return to the subject observing condition.

It is determined in Step 209 if the photographing operation is to be completed. When it is determined that the completion of the photographing operation has been selected, a photographing operation completion process is carried out. Conversely, when it is determined that the completion of the photographing operation has not been selected, the process goes back to Step 201, and the process waits until the release button 11 is depressed.

According to the second embodiment, the half-mirror 91B integrated with the optical low-pass filter 91A is utilized instead of the quick return mirror, and the quick return mirror does not have to be provided. Accordingly, the mirror box 90 is miniaturized, and further the structure of the drive mechanism becomes simple, in comparison with the first embodiment.

Note that, in the second embodiment, the view-finder shutter 92 has to be provided at a position so that light entering the eyepiece 42 does not reach the CCD 50. Further, the half-mirror integrated filter 91 may be fixed at the first position (not moved to the second position), if the half-mirror integrated filter 91 leads the incident light to both of the view-finder 40 and the CCD 50 in a state in which the half-mirror integrated filter 91 is positioned at the first position.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2000-381761 (filed on Dec. 15, 2000) which is expressly incorporated herein, by reference, in its entirety.

What is claimed is:

1. A mirror box comprising:
   a mirror that is selectively set to one of a reflecting position, which is on an optical path between a photographing lens and an imaging device so that incident light passing through said photographing lens is reflected to a view-finder, and a retracted position, which is out of said optical path so that said incident light is led to said imaging device; and
   a filter that is selectively set to one of a non-functioning position, which is close to said mirror, when said mirror is set to said reflecting position, and a functioning position, which is on said optical path so that a predetermined light component contained in said incident light is blocked, when said mirror is set to said retracted position, said filter comprising an optical low-pass filter, and said mirror comprising a half-mirror which is integrally provided on an incident surface of said optical low-pass filter.

2. A mirror box according to claim 1, wherein said predetermined light component contains a high-frequency component.

3. A mirror box according to claim 1, wherein said predetermined light component contains an infrared wavelength component.

4. A mirror box according to claim 1, further comprising a drive mechanism that drives said mirror and said filter between their respective positions.

5. A mirror box according to claim 1, wherein said reflecting position is inclined by substantially 45 degrees with respect to the optical axis of said photographing lens, said retracted position is substantially parallel to the optical axis, said non-functioning position is behind said mirror and is parallel to said mirror when said mirror is set to said reflecting position, and said functioning position is perpendicular to the optical axis.

6. The mirror box according to claim 1, the optical low-pass filter comprising a crystal plate that filters a high frequency component and an infrared cut filter that filters an infrared component.

7. An electronic still camera comprising:
   a view-finder through which a subject image obtained by a photographing lens can be observed;
   a half mirror that is integrally provided with an optical low-pass filter, said half mirror being provided between said photographing lens and an imaging device, and movable between a first position, at which incident light passing through said photographing lens is reflected to said view-finder, and a second position, at which a predetermined light component contained in said incident light is blocked to lead said incident light, without the predetermined light component, to said imaging device; and
   a view-finder shutter that is provided between said view-finder and said half mirror, said view-finder shutter blocking light when said half mirror is set to said second position.

8. A mirror box according to claim 7, wherein said predetermined light component contains a high-frequency component.

9. A mirror box according to claim 7, wherein said predetermined light component contains an infrared wavelength component.

10. A mirror box according to claim 7, the optical low-pass filter comprising a crystal plate that filters a high frequency component and an infrared cut filter that filters an infrared component.

11. A mirror box according to claim 7, further comprising a drive mechanism that drives said half-mirror and said optical low-pass filter between the first and second positions.

12. A mirror box according to claim 7, wherein said first position is inclined by substantially 45 degrees to the optical axis of said photographing lens and said second position is substantially perpendicular to the optical axis.

* * * * *